United States Patent
Murata et al.

(10) Patent No.: US 7,549,102 B2
(45) Date of Patent: Jun. 16, 2009

(54) TRANSMITTING APPARATUS, RECEIVING APPARATUS, AND RE-TRANSMISSION CONTROL METHOD

(75) Inventors: Syuuichi Murata, Yokohama (JP); Atsushi Tanaka, Yokohama (JP); Junichi Niimi, Kunitachi (JP); Takahiro Matusaki, Miura (JP); Akihide Otonari, Kasuya (JP); Yuka Araikawa, Fukuoka (JP); Kazuhisa Obuchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 11/156,895

(22) Filed: Jun. 21, 2005

(65) Prior Publication Data

US 2006/0107165 A1    May 18, 2006

(30) Foreign Application Priority Data

Oct. 28, 2004    (JP) ............................... 2004-313986

(51) Int. Cl.
*G08C 25/02* (2006.01)
(52) U.S. Cl. .................. 714/748; 714/749; 714/754
(58) Field of Classification Search .................. 714/748, 714/749, 750, 754, 746; 375/267
See application file for complete search history.

(56) References Cited

U.S. PATENT DOCUMENTS

| | | | | |
|---|---|---|---|---|
| 6,292,516 B1 * | 9/2001 | Petsko et al. ................. 375/267 |
| 6,504,846 B1 * | 1/2003 | Yu et al. ...................... 370/412 |
| 6,539,205 B1 * | 3/2003 | Wan et al. .................... 370/465 |
| 6,990,627 B2 * | 1/2006 | Uesugi et al. ................ 714/794 |
| 7,035,894 B2 * | 4/2006 | Park et al. .................... 709/200 |
| 7,131,048 B2 * | 10/2006 | Suzuki et al. ................ 714/748 |
| 7,200,789 B2 * | 4/2007 | Kim et al. .................... 714/748 |
| 7,236,740 B2 * | 6/2007 | Koo et al. .................... 455/13.4 |

OTHER PUBLICATIONS

3GPP TS 25.212 V6.2.0(Jun. 2004) "3$^{rd}$ Generation Partnership Project; Technical Specification Group Radio Access Network; Multiplexing and Channel Coding (FDD)" (Release 6).
3GPP TS 25.214 V6.2.0 (Jun. 2004); 3$^{rd}$ Generation Partnership Project; Technical Specification Group Radio Access Network; Physical Layer Procedures (FDD) (Release 6).

* cited by examiner

*Primary Examiner*—Esaw T Abraham
*Assistant Examiner*—Fritz Alphonse
(74) *Attorney, Agent, or Firm*—Hanify & King, P.C.

(57) ABSTRACT

A wireless communication device performs error correction decoding after combining newly received data from a new transmission of data and retransmitted received data from a retransmission of the data. The wireless communication device comprises a storage unit operable to store newly received data, a reception quality evaluation unit operable to evaluate reception quality for the retransmitted received data or reception quality for combined data obtained by combining the retransmitted received data with the newly received data stored in the storage unit, and a control unit operable to perform control as to whether to decode the retransmitted received data or the combined data according to the results of the evaluation.

6 Claims, 5 Drawing Sheets

TRANSMITTING APPARATUS, RECEIVING APPARATUS, AND RE-TRANSMISSION CONTROL METHOD

CROSS REFERENCE TO RELATED APPLICATION

This application is related to and claims priority to Japanese Application No. 2004-313986 filed Oct. 28, 2004 in the Japanese Patent Office, the contents of which are incorporated by reference herein.

BACKGROUND OF THE INVENTION

1. Field of the Invention

The present invention relates to wireless communication devices and mobile stations. Typical examples of systems using wireless communication devices and mobile stations include W-CDMA (UMTS) mobile communication systems.

2. Description of the Related Art

Currently, standardization of the W-CDMA (UMTS) protocol, a protocol for third generation mobile communication systems, is proceeding under the 3GPP (3rd Generation Partnership Project). HSDPA (High Speed Downlink Packet Access), which provides a maximum downlink transfer speed of approximately 14 Mbps, has been specified as one of the themes for standardization.

HSDPA is characterized in that it employs an adaptive coding modulation scheme, switching for example between the QPSK modulation scheme and 16-QAM scheme adaptively according to the wireless environment between the base station and mobile station.

Furthermore, HSDPA employs an H-ARQ (Hybrid Automatic Repeat ReQuest) scheme. Under H-ARQ, when a mobile station detects an error in data received from a base station, a retransmission request is made by the mobile station in question to the base station, and retransmission of data from the base station is carried out accordingly.

Moreover, the mobile station performs error correction decoding using both already received data and retransmitted received data. In this way, H-ARQ makes it possible to obtain combining gain and reduce the number of retransmissions by effectively using already received data.

The main wireless channels used in HSDPA include HS-SCCH (High Speed-Shared Control Channel), HS-PDSCH (High Speed-Physical Downlink Shared Channel) and HS-DPCCH (High Speed-Dedicated Physical Control Channel).

HS-SCCH and HS-PDSCH are both shared downlink (i.e. in the direction from the base station to the mobile station) channels. HS-SCCH is a control channel for transmitting various parameters relating to the data transmitted on HS-PDSCH. The various parameters include, for example, modulation type information indicating which modulation scheme is used to transmit data on HS-PDSCH, the spread code allocation number (code number), information on the rate matching pattern applied to the transmitted data, etc.

Furthermore, HS-DPCCH is a dedicated control channel in the direction from the mobile station to the base station (namely, uplink), which is used by the mobile station for sending ACK or NACK signals to the base station depending on whether or not it was able to receive data via HS-PDSCH.

If the mobile station fails to receive data (if the received data has a CRC error, etc.), a NACK signal will be transmitted from the mobile station to the base station and the base station will accordingly perform retransmission control.

In addition, HS-DPCCH is used by a mobile station which has determined the reception quality (e.g. SIR) of the signal received from the base station to transmit the results thereof periodically to the base station as a CQI (Channel Quality Indicator). The base station judges the goodness of the downstream wireless environment based on the received CQI, and if it is good, switches to a modulation scheme allowing transmission of data at higher speed or the like. If the wireless environment is not good, the base station adaptively switches to a modulation scheme which transmits data at a lower speed or the like.

Channel Structure

Next, the channel structure of HSDPA will be described.

FIG. 1 is a drawing which illustrates the channel configuration of HSDPA. Since W-CDMA employs a code division multiplexing scheme, the individual channels are separated by code.

First, the channels which have not been explained will be briefly described.

CPICH (Common Pilot Channel) and P-CCPCH (Primary Common Control Physical Channel) are downlink common channels.

CPICH is a channel for transmitting a so-called pilot signal, and is used by the mobile station for channel estimation, cell search, and as timing reference for other physical channels in the same cell. P-CCPCH is a channel for transmitting notification information. Although this is not illustrated, SCH for cell search is transmitted in the header part of each slot, and since there is no orthogonality to other channels, it serves as an interference source for the other channels.

Next, the timing relationship of the individual channels will be described.

As shown in FIG. 1, in each channel, one frame (10 ms) consists of 15 slots. As described above, CPICH is used as a reference for other channels, so the head of the P-CCPCH and HS-SCCH frames is aligned with the head of the CPICH frame. Here, the head of the HS-PDSCH frame is delayed by 2 slots relative to HS-SCCH, etc. This is because advance notice of the modulation type information and spreading code information which is needed by the mobile station to perform demodulation of HS-PDSCH is provided via HS-SCCH. Therefore, the mobile station selects the appropriate demodulation scheme and de-spreading code according to this information whereof notification is given on HS-SCCH and then executes processing such as HS-PDSCH demodulation.

Furthermore, HS-SCCH and HS-PDSCH comprise subframes of 3 slots each.

The foregoing was a brief description of the channel configuration of HSDPA.

Next, the content and coding procedure of the data transmitted on HS-SCCH will be described.

Data Transmitted on HS-SCCH

The following data are transmitted on HS-SCCH. These data are used for reception processing of HS-PDSCH, which is transmitted after a 2-slot delay.

(1) Xccs (Channelization Code Set information)
(2) Xms (Modulation Scheme information)
(3) Xtbs (Transport Block Size information)
(4) Xhap (Hybrid ARQ Process information)
(5) Xrv (Redundancy and constellation Version)
(6) Xnd (New Data indicator)
(7) Xue (User Equipment identity)
(1) through (7) will now be described.

(1) Xccs is a datum indicating the spreading code used for transmitting data on HS-PDSCH (e.g., a datum indicating a multicode number and code offset combination), and consists of 7 bits.

(2) Xms is a datum indicating that the modulation scheme used on HS-PDSCH is either QPSK or 16-QAM, and consists of 1 bit.

(3) Xtbs is a datum used for computing the transport block size of data transmitted on HS-PDSCH (the size of data transmitted in one HS-PDSCH sub-frame), and consists of 6 bits.

(4) Xhap is a datum formed from 3 bits indicating the H-ARQ process number. The base station is fundamentally unable to judge whether data could be received or not by the mobile station until the base station receives an ACK or NACK. However, if one were to wait until receiving an ACK or NACK before transmitting a new data block, the transport efficiency would drop. Thus, to allow transmission of new data blocks before an ACK or NACK is received, a process number is defined for each data block transmitted in a sub-frame, and the mobile station is made to discriminate the reception processing according to the process number. In other words, when performing retransmission, the base station matches the process number of each transport block by assigning the same process number as the process number assigned to the earlier sent transport block, and transmits it in advance via HS-SCCH as Xhap.

Therefore, the mobile station classifies the data received via HS-PDSCH based on the Xhap it has received, distinguishing between new transmission and retransmission within a data stream for which the same process number was provided via HS-SCCH based on Xnd, which will be discussed below, combining new data with retransmitted data (H-ARQ processing, etc.), and the like.

(5) Xrv is a datum indicating the redundancy version (RV) parameters (s, r) and constellation version parameter (b) for HS-PDSCH retransmission, and consists of 3 bits.

With regard to Xrv, there is a first technique (Incremental Redundancy) whereby parameters are updated for new transmission and retransmission, and a second technique (Chase Combining) whereby the parameters are not changed for new transmission and retransmission.

With the first technique, the puncture pattern and the like changes, so the bits to be transmitted for new transmission and retransmission change, while with the second technique, they do not change.

(6) Xnd is a datum indicating whether the block transmitted on HS-PDSCH is a new block or a retransmitted block, and consists of 1 bit. For example, when transmitting a new block, it would be switched from 0 to 1 or from 1 to 0, and for retransmission, it would not be switched and the same value as before would be used.

For example, when performing new transmission, retransmission, new transmission, retransmission, retransmission, and new transmission in that order, Xnd would change as follows: 1, 1, 0, 0, 0, 1.

(7) Xue is a datum indicating mobile station identification information, and consists of 16 bits.

Coding of Data Transmitted on HS-SCCH

FIG. 2 is a drawing illustrating the coding procedure (coding device) for the aforementioned data (1) through (7) which are transmitted on HS-SCCH, which is executed mainly in the base station.

In the drawing, 1 is a coding unit, 2 is a rate matching unit, 3 is a multiplier, 4 is a CRC computation unit, 5 is a multiplier, 6 is a coding unit, 7 is rate matching unit, 8 is a coding unit and 9 is a rate matching unit.

Next, the operation of each block will be explained.

(1) Xccs, represented by 7 bits ($x1,1$~$x1,7$), and (2) Xms, represented by 1 bit ($x1,8$) are input into the coding unit 1 as a datum of 8 bits total. Here, the first number of the subscript signifies that this relates to data transmitted in the first slot, and the second number, separated by a comma (,), indicates the number of the bit.

Coding unit 1 appends 8 tail bits to the input data and performs convolution coding with a code rate of ⅓ on the total of 16 bits. Therefore, the coded data becomes a total of 48 bits, and is supplied as $z1,1$~$z1,48$ to the rate matching unit 2. Rate matching unit 2 performs puncture or repetition processing or the like on specific bits to adjust to a bit number that will fit into the first slot (here, assumed to be 40 bits), and outputs the result ($r1,1$~$r1,40$).

Data from the rate matching unit 2 is multiplied with $c1$~$c40$ by the multiplier 3 and output as $s1,1$~$s1,40$, and is transmitted in the first slot (first part), which is the leading slot of one sub-frame in the HS-SCCH of FIG. 1.

Here, $c1$~$c40$ are obtained by taking data from (7) Xue ($xue1$~$xue16$), appending 8 tail bits thereto and then convolution coding with a coding rate of ½ in coding unit 8 to obtain $b1$~$b48$, and further performing the same sort of bit adjustment in rate matching unit 9 as was done in rate matching unit 2.

Meanwhile, the 6-bit (3) Xtbs ($x2,1$~$x2,6$), 3-bit (4) Xhap ($x2,7$~$x2,9$) and 3-bit (5) Xrv ($x2,10$~$x2,12$) and 1-bit (6) Xnd ($x2,13$), or a total of 13 bits $y2,1$~$y2,13$, are input with 16 bits $y2,14$~$y2,29$, for a total of 29 bits $y2,1$~$y2,29$, into coding unit 6.

Here, $y2,14$~$y2,29$ are obtained by performing CRC computation processing on the total of 21 bits of (1) through (6) in the CRC computation unit 4 and multiplying $c1$~$c16$, as the result of the computation, by (7) Xue ($xue1$~$xue16$).

The $y2,1$~$y2,29$ which are input into coding unit 6 have 8 tail bits added thereto and are convolution coded with a ⅓ coding rate and input as 111-bit data $z2,1$~$z2,111$ into the rate matching unit 7.

The rate matching unit 7 outputs 80 bits, $r2,1$~$r2,80$ by means of the aforementioned puncture or other such processing, and these $r2,1$~$r2,80$ are transmitted in the second and third slots (second part) in one sub-frame on HS-SCCH of FIG. 1.

As described above, the data of (1) and (2) are transmitted in the first part, while (3) through (6) are transmitted in the second part, thus being transmitted distinctly in separate slots; on the other hand, the CRC computation is carried out on them in common, with the CRC computation results being transmitted within the second part, so detection of reception error becomes possible once both the first and second part are completely received.

Furthermore, since the data to be transmitted in the first part is convolution coded by coding unit 1 and then multiplied by (7) Xue by the multiplier 3, when data addressed to another station is received in the first slot, the path metric value and the like generated in the decoding process will be smaller compared to if it were addressed to the receiving station, thus making it possible to know if there is a high probability of the data not being addressed to the receiving station by comparing the path metric value to a reference value.

Coding of Data Transmitted on HS-PDSCH

Next, the process until the transmission data is transmitted via HS-PDSCH will be described using a block diagram.

FIG. 3 is a diagram illustrating a transmission device of the present invention.

A transmission device (wireless base station) of an HSDPA-compatible W-CDMA communication system as described above will be discussed as an example of a transmission device. The invention can also be applied to transmission devices of other communication systems.

In the drawing, 10 represents a control unit which outputs the transport data in order to be transmitted via HS-PDSCH (the data transmitted within one sub-frame) as well performing control of the various units (11 through 26, etc.). The values of (1) through (7) explained in FIG. 2 are given by this control unit 10.

Since HS-PDSCH is a shared channel, it is permitted for the output transport data to be addressed to different mobile stations.

11 represents a CRC attachment unit which performs CRC computation on the input transport data (data transmitted within the same wireless frame) and attaches the results of CRC computation to the tail of the transport data, and 12 represents a bit scrambling unit which imparts randomness to the transmitted data by applying a bit-unit scramble to the transport data with the CRC computation results attached thereto.

13 represents a code block segmentation unit which segments (e.g. into two equal parts) the input bit-scrambled transport data if it exceeds a certain data length, for the purpose of preventing the computation load of the receiving side decoder from increasing due to excessive length of the data to be coded in the subsequently performed channel coding, or for other purposes. The drawing shows a case where the input data length exceeded a specific data length and the output has been split into two equal parts (segmented into a first data block and second data block). Of course, cases where the number of segments segmented into is other than two are also possible, as are cases where the segments are not equal parts but have different data length.

14 represents a channel coding unit which performs error correction coding individually on each segmented datum. Here, a turbo coder will be used for the channel coding unit 14.

Thus, the first output, for the first block, contains the important systematic bits (U) which are the same data as the data subjected to coding, the first redundancy bits (U') obtained by convolution coding of the systemic bits (U), and the second redundancy bits (U") obtained by interleaving and then similarly convolution coding the systematic bits. Likewise, the second output contains the systematic bits (U), first redundancy bits (U'), and second redundancy bits (U") for the second block.

15 represents a bit separation unit which separates the first block and second block serially input from the channel coding unit 14 (turbo coder) into systematic bits (U), first redundancy bits (U') and second redundancy bits (U") and outputs them.

16 represents a first rate matching unit which performs rate matching, such as puncturing, on the input data so that the input data (in cases where data is segmented into multiple blocks, all the data of the segmented blocks) will be of a quantity that fits into a specific region of the subsequent virtual buffer unit 17.

17 represents a virtual buffer unit wherein a region is established by the control unit 10 according to the reception processing capacity of the mobile station to be transmitted to, in which region data rate-matched by the first rate matching unit 16 is buffered. For retransmission, by outputting the buffered data, the processing from the CRC attachment unit 11 to the first rate matching unit 16 can be omitted, but in cases where one wishes to modify the coding rate for retransmission or the like, it is desirable to re-output the transmission data stored in the control unit 10 and not use the buffered data. It is also possible to actually provide no buffer for the virtual buffer 17 and simply make it pass-through. In this case, retransmitted data would be re-output from the control unit 10.

18 represents a second rate matching unit for adjusting data to a length that can bit into a sub-frame designated by the control unit 10; it adjusts the data length of input data by performing puncture and repetition processing so as to obtain the designated data length.

This second rate matching unit 18 performs rate matching according to the previously explained RV parameters.

Namely, depending on the RV parameters, when s=1, rate matching is performed so as to leave as many systematic bits as possible, and when s=0, it is permitted on the contrary to reduce the systematic bits and leave more redundancy bits. Furthermore, puncture and rate matching are preformed by a pattern that follows r.

19 represents a bit collection unit which arranges the data from the second rate matching unit 19 into a plurality of bit sequences. Namely, data of the first block and data of the second block are arranged according to a specific bit arrangement method to output a plurality of bit sequences for designating signal points on a phase plane. Since a 16-QAM modulation scheme is used in this example, the bit sequence consists of 4 bits. When using a 64-QAM modulation scheme, the bit sequence would be made 6 bits, and when using a QPSK modulation scheme, the bit sequence would be made 2 bits.

20 segments and outputs the bit sequences into the same number of branches as the spreading code number indicated by the control unit 10. Namely, it represents a physical channel segmentation unit which, when the code number in the transmission parameters indicated by the control unit 10 is N, maps and outputs the input bit sequence sequentially to branches 1 through N.

21 represents an interleaving unit which performs interleaving on the bit sequences of N branches and outputs the result.

22 represents a constellation rearrangement unit for 16-QAM, which is capable of rearranging bits within each input bit sequence. Bit rearrangement is performed according to the previously described constellation version. Examples of bit rearrangement include swapping the high order and low order bits. It is preferable to perform bit swapping for multiple bit sequences according to the same rule.

23 represents a physical channel mapping unit which maps the bit sequences of N branches onto the corresponding spreading block of the subsequent spreading unit 24.

24 represents a spreading unit which comprises multiple spreading blocks, each of which outputs a corresponding I and Q voltage based on each bit sequence of N branches and performs spreading with a different spreading code and outputs the result.

25 represents a modulating unit which combines the signals spread by the spreading unit 24, performs 16-QAM modulation scheme amplitude phase modulation or the like on the result thereof, amplifies it by means of a variable gain amplifier, further frequency-converts it to a wireless signal, and then outputs it to the antenna side as a wireless signal to enable transmission.

Under HSDPA, it is possible to multiplex signals addressed to other mobile stations within sub-frames of the same timing by means of a spreading code, so it is desirable to provide a plurality of sets of 10 through 25, variable gain amplifier, etc. (these will be referred to as transmission sets), combine the output signals of the variable gain amplifiers, frequency-convert them together, and then transmit the result to the antenna side. Of course, since there is a need to separate by code, for the spreading code used by the spreading unit 24 of each transmission set, a different spreading code would be used so as to allow separation.

26 represents a receiving unit, which receives signals from the mobile station received via HS-DPCCH or the like, and provides ACK and NACK signals, CQI, etc. to the control unit 10.

As discussed above, if an ACK signal is received, the next new data is transmitted, but in the case of a NACK signal or if there is no response within a specific period of time, the control unit 10 performs retransmission control so as to retransmit the transmitted data. Retransmission is limited to the maximum number of retransmissions that is set, and if no ACK signal is received from the mobile station upon reaching the maximum number of retransmissions, control is provided to switch to transmission of the next new data.

In cases where a maximum number of retransmissions is not defined, it is possible to start a timer from a new transmission and switch to transmission of the next new data when a specific time period is detected to have elapsed and no ACK signal has been received.

The foregoing was a description of the names and operation of the various units.

Matters relating to HSDPA as discussed above are disclosed for instance in 3G TS 25.212 (3rd Generation Partnership Project: Technical Specification; Group Radio Access Network; Multiplexing and channel coding (FDD)) and in 3G TS 25.214 (3rd Generation Partnership Project: Technical Specification; Group Radio Access Network; Physical layer procedures (FDD))

According to aforementioned background of this invention, the wireless communication device judges whether received data (via HS-PDSCH) is transmitted as new transmission or transmission based on data (Xnd or the like) which is used for discriminating between new transmission and retransmission. If the wireless communication device judges as new transmission, then it performs error correcting decoding for received new transmission data.

In here, when error is detected for the decoded result, the wireless communication device stores the received new transmission data and performs error correcting decoding again for combined data of both the stored new data and received data relating to retransmission of the new data. Accordingly, the error correcting decoding is conducted every time regardless of new transmission or retransmission.

SUMMARY OF THE INVENTION

One of objects of this invention is to reduce consumption of power by devising the method for error correcting decoding.

Wile, if likelihood of the second data which is retransmitted in case that error is detected for data obtained by performing error correcting decoding of first data in spite of the first data has high likelihood, then likelihood of data obtained by combining the first data and the second data is controlled mainly by the likelihood of the first data. Accordingly, it is possible to occur an error for decoded result relating the combined data as the first data.

Therefore, another object of this invention is to make it possible to rectify the adverse effect caused by received data for which errors were not eliminated by error correction decoding despite the high reception quality (likelihood).

Other objects will be derived from the following embodiments.

The present invention employs a wireless communication device which performs error correction decoding after combining newly received data for new transmission of data and retransmitted received data for retransmission of said data, said wireless communication device being characterized in that it comprises: a storage unit which stores newly received data; a reception quality evaluation unit which evaluates the reception quality for said retransmitted received data or the reception quality for combined data obtained by combining said retransmitted received data with the newly received data stored in said storage unit; and a control unit which performs control as to whether to decode said retransmitted received data or said combined data according to the results of said evaluation.

The present invention furthermore employs a wireless communication device as set forth in (1), characterized in that said control unit performs control such that decoding is not performed for said retransmitted received data or said combined data if the reception quality for said retransmitted received data or the reception quality for said combined data is below a specific reference value.

The present invention employs a wireless communication device which performs error correction decoding after combining newly received data for new transmission of data and retransmitted received data for retransmission of said data, said wireless communication device being characterized in that it comprises: a storage unit which stores said newly received data; a reception quality evaluation unit which evaluates a first reception quality for said newly received data, and a second reception quality for said retransmitted received data or a third reception quality for combined data comprising said newly received data and said retransmitted received data; and a control unit which performs control such that decoding is not performed for said retransmitted received data or said combined data if the second reception quality or third reception quality is inferior to a specific degree as compared to said first reception quality.

The present invention furthermore employs a wireless communication device as set forth in (1) or (3), characterized in that said evaluation of reception quality is performed based on the likelihood that the received signal represents each signal point.

The present invention employs a wireless communication device which performs error correction decoding after combining newly received data for new transmission of data and retransmitted received data for retransmission of said data, said wireless communication device being characterized in that it comprises: a storage unit which stores said newly received data; a reception quality evaluation unit which evaluates a first reception quality for said newly received data, and a second reception quality for said retransmitted received data or a third reception quality for combined data comprising said newly received data and said retransmitted received data; and a control unit which performs control such that said retransmitted received data rather than said combined data is decoded when said second reception quality or third reception quality is inferior to a specific degree as compared to said first reception quality.

The present invention employs a wireless communication device which performs error correction decoding after combining newly received data for new transmission of data and retransmitted received data for retransmission of said data, said wireless communication device being characterized in that it comprises: a storage unit which stores said newly received data; a reception quality evaluation unit which evaluates a first reception quality for said newly received data and a second reception quality for said retransmitted received data; and a control unit which performs control such that decoding is performed after multiplying the newly received data stored in said storage unit by 1/n (n is a number greater than 1) and combining it with said retransmitted received data if said second reception quality is inferior to a specific degree as compared to said first reception quality.

The present invention furthermore employs a wireless communication device as set forth in (6), characterized in that said n corresponds to (said second reception quality)/(said first reception quality).

The present invention employs a wireless communication device which performs error correction decoding after combining newly received data for new transmission of data and retransmitted received data for retransmission of said data, said wireless communication device being characterized in that it comprises: a storage unit which stores said newly received data; a reception quality evaluation unit which evaluates a first reception quality for, said newly received data and a second reception quality for said retransmitted received data; and a control unit which performs control such that portions of said newly received data which are contained in said retransmitted received data are replaced with said retransmitted data in said combining if said second reception quality is inferior to a specific degree as compared to said first reception quality.

The present invention employs a wireless communication device which performs error correction decoding after combining newly received data for new transmission of data and retransmitted received data for retransmission of said data, said wireless communication device being characterized in that it comprises: a storage unit which stores said newly received data; a reception quality evaluation unit which evaluates a first reception quality for said newly received data and a second reception quality for said retransmitted received data; and a control unit which performs control such that, when said second reception quality is inferior to a specific degree as compared to said first reception quality, during said combining, data portions contained in said newly received data but not contained in said retransmitted received data are multiplied by 1/n (n is a number greater than 1) and then combined.

The present invention employs a wireless communication device which performs error correction decoding after combining newly received data for new transmission of data and retransmitted received data for retransmission of said data, said wireless communication device being characterized in that it comprises: a storage unit which stores said newly received data; a reception quality evaluation unit which evaluates a first reception quality for said newly received data and a second reception quality for said retransmitted received data; and a control unit which performs control such that, if said second reception quality is inferior to a specific degree as compared to said first reception quality, said retransmitted received data is stored in said storage unit, and decoding is performed after combining the retransmitted received data stored in said storage unit with data received in an additional retransmission.

A communication device according to the present invention makes it possible to reduce consumption of power by devising the method for error correcting decoding.

A communication device according to the present invention makes it possible to reduce the occurrence of reception errors.

Furthermore, a communication device according to the present invention makes it possible to rectify the adverse effect caused by received data for which errors were not eliminated by error correction decoding despite the high reception quality (likelihood).

DETAILED DESCRIPTION OF THE PREFERRED EMBODIMENTS

Figure 1:
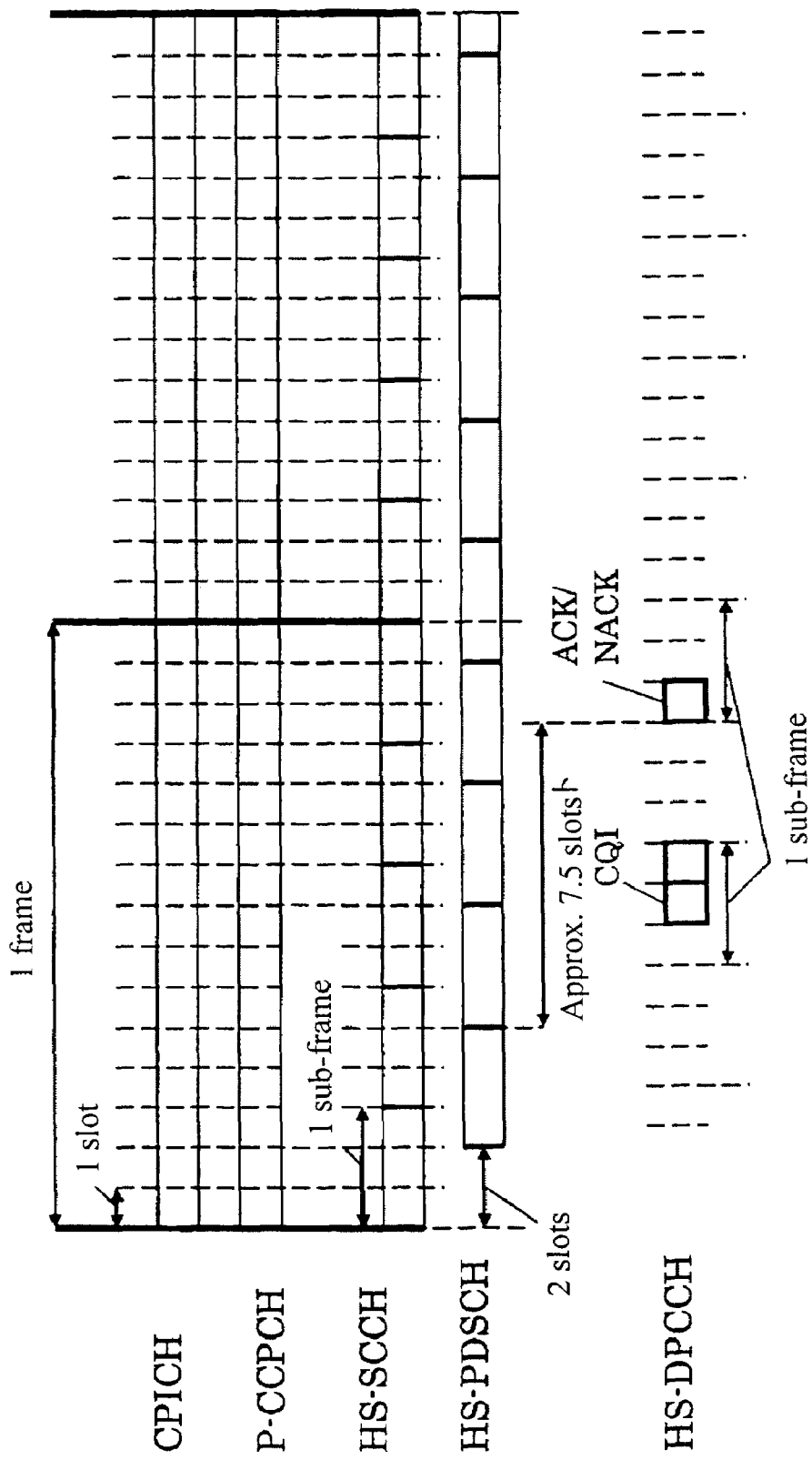
FIG. 1 is a drawing which illustrates the channel configuration of HSDPA.

Below, modes for practicing the present invention are described by referring to the drawings.

(a) Description of First Embodiment

In this embodiment, error correction decoding is not performed in cases where a high probability that error-free error correction decoding results will not be obtained is detected, thereby reducing the power consumption of the wireless communication device.

Figure 4:
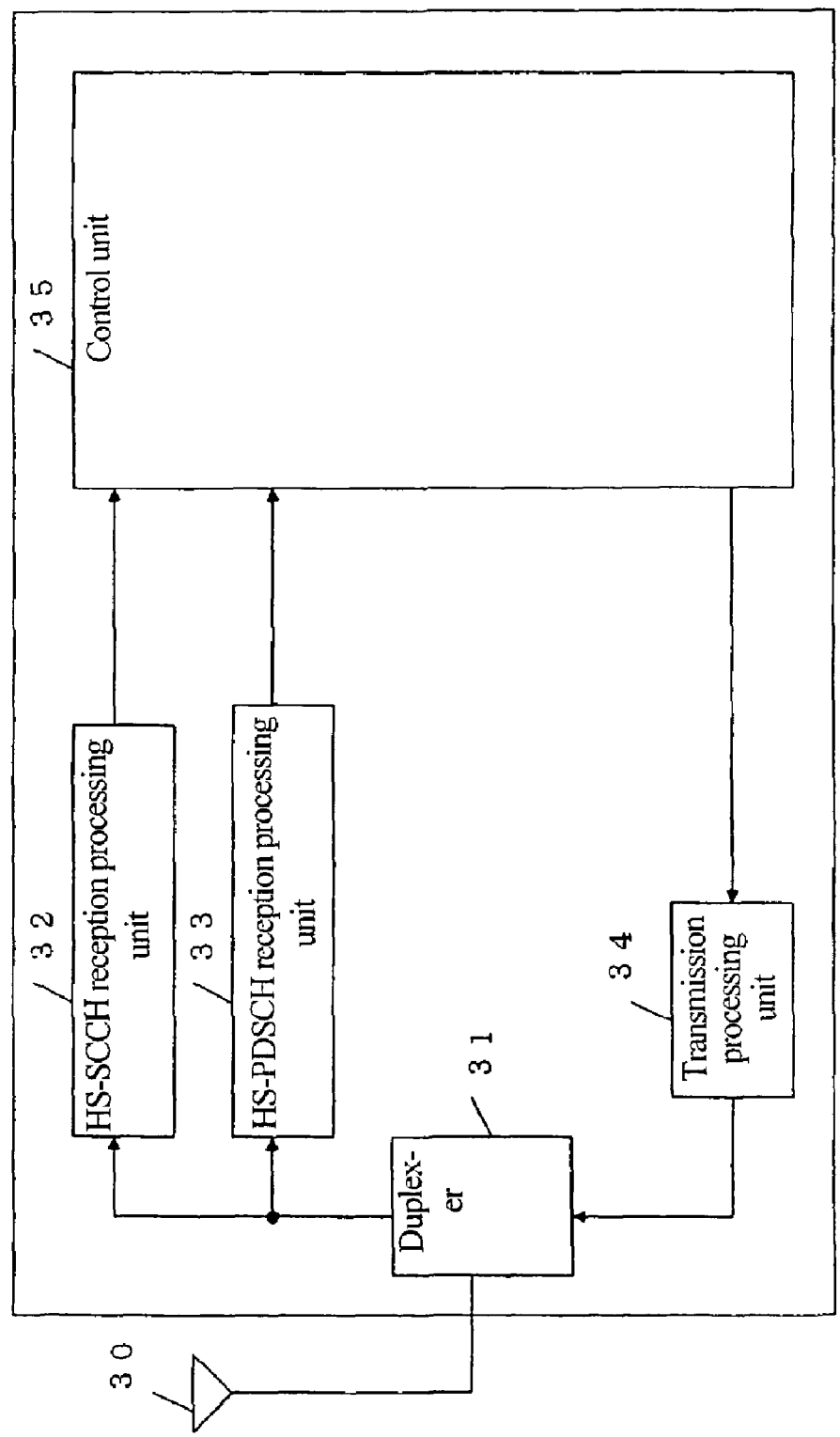
FIG. 4 is a drawing which illustrates a communication device (mobile station) according to the present invention.

FIG. 4 is a drawing illustrating a communication device according to the present invention.

A mobile station in an HSDPA-compatible W-CDMA (JMTS) communication system as described above will be discussed as an example of a communication device. The invention can also be applied to communication devices in other communication systems.

In the drawing, 30 represents an antenna, 31 represents a duplexer for sharing the antenna 30 between transmission and reception, 32 represents an HS-SCCH reception processing unit, 33 represents an HS-PDSCH reception processing unit, 34 represents a transmission processing unit which performs transmission on HS-DPCCH and the like, and 35 represents a control unit which performs control of the various units. Control unit 35 is provided with a reordering function for reordering received data blocks based on the TSN (transport sequence number) contained in the received data blocks, and an RLC layer processing function for processing data blocks after they have been reordered.

Next, the operation of the wireless device (mobile station) illustrated in FIG. 4 will be described.

Operation during new transmission of data

Signals transmitted from the wireless base station (see FIGS. 1 through 3) are received by the antenna 30 of the mobile station.

Signals received by antenna 30 are input into the HS-SCCH reception processing unit 32 and HS-PDSCH reception processing unit 33.

The mobile station also has reception processing units that perform reception processing of other channels, but description thereof will be omitted here.

With regard to HS-SCCH, detection of whether the transmission was addressed to the mobile station is made by receiving the previously described HS-SCCH and performing decoding, such as Viterbi decoding, thereon.

Here, if it is detected that the transmission was addressed to the mobile station, the information needed for reception processing of HS-PDSCH, which is delayed by 2 slots, such as the Xccs and Xms contained in the first part, is provided to the control unit 35.

The control unit 35 sets the parameters of demodulation, de-spreading, etc. for the HS-PDSCH reception processing unit 33 based on the information provided, such as Xccs, Xms, etc.

Namely, de-spreading code set indicated in Xccs is given to the HS-PDSCH reception processing unit 33, and control is performed so that demodulation and the like will be performed according to the modulation scheme (QPSK, 16-QAM) indicated in Xms.

Furthermore, decoding is also performed on the second part of HS-SCCH, extracting information such as Xtbs, Xhap, Xrv, Xnd, etc., and providing them to the HS-PDSCH reception processing unit 33.

The HS-PDSCH reception processing unit 33 executes decoding and other processing according to the information contained in the second part.

Figure 5:
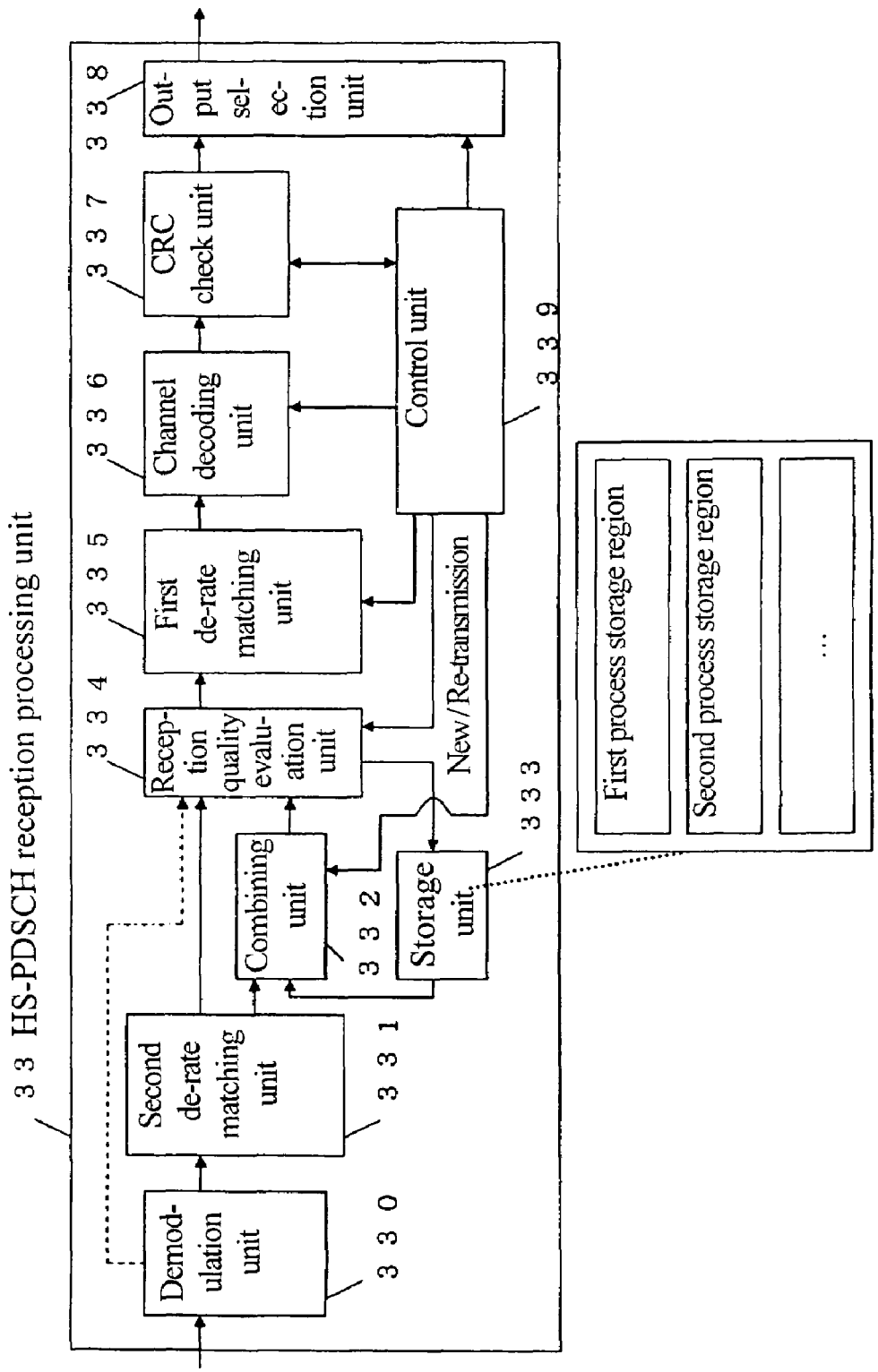
FIG. 5 is a drawing which illustrates an HS-PDSCH reception processing unit.

The HS-PDSCH reception processing unit 33, as illustrated in FIG. 5, comprises a demodulation unit 330, second de-rate matching unit 331, combining unit 332, storage unit 333, (reception) quality evaluation unit 334, first de-rate matching unit 335, channel decoding unit 336, CRC check unit 337 (an example of an error detection unit), output selection unit 338 and control unit 339.

The demodulation unit 330, as stated earlier, executes demodulation processing, including de-spreading and the like, according to the information indicated in the first part.

The second de-rate matching unit 331 furthermore executes processing, corresponding to the opposite of the second rate matching (the processing of the second rate matching unit 18) performed in the wireless base station, based on the Xrv indicated in the second part. If the transmission was made with a plurality of spreading codes, multiplexing is performed at the same time.

The output of the second de-rate matching unit 331 is fed to the quality evaluation unit 334.

The reception quality evaluation unit 334 is informed by the control unit 339 (or control unit 35) that the reception is a new reception, and thus evaluates the reception quality for the input newly received data (if evaluation of the reception quality of newly received data is not needed, this processing can be omitted).

For example, the reception quality may be evaluated by finding the mean value of the soft decision data part (the likelihood that the received signal represents each signal point). It is also possible to acquire the reception SIR for the newly received data from the demodulation unit 330 and evaluate it as the reception quality for the newly received data.

Newly received data for which the reception quality has been evaluated by the reception quality evaluation unit 334 is stored in the storage unit 333 and input into the first de-rate matching unit 335.

Since there is a need to separately perform combining for each process indicated by Xhap, the storage unit 333 keeps a different storage region for each process. Namely, if Xhap indicated that this is the first process, the received data would be stored in a first process storage region; if Xhap indicated that this is the second process, the received data would be stored in a second process storage region.

Figure 3:
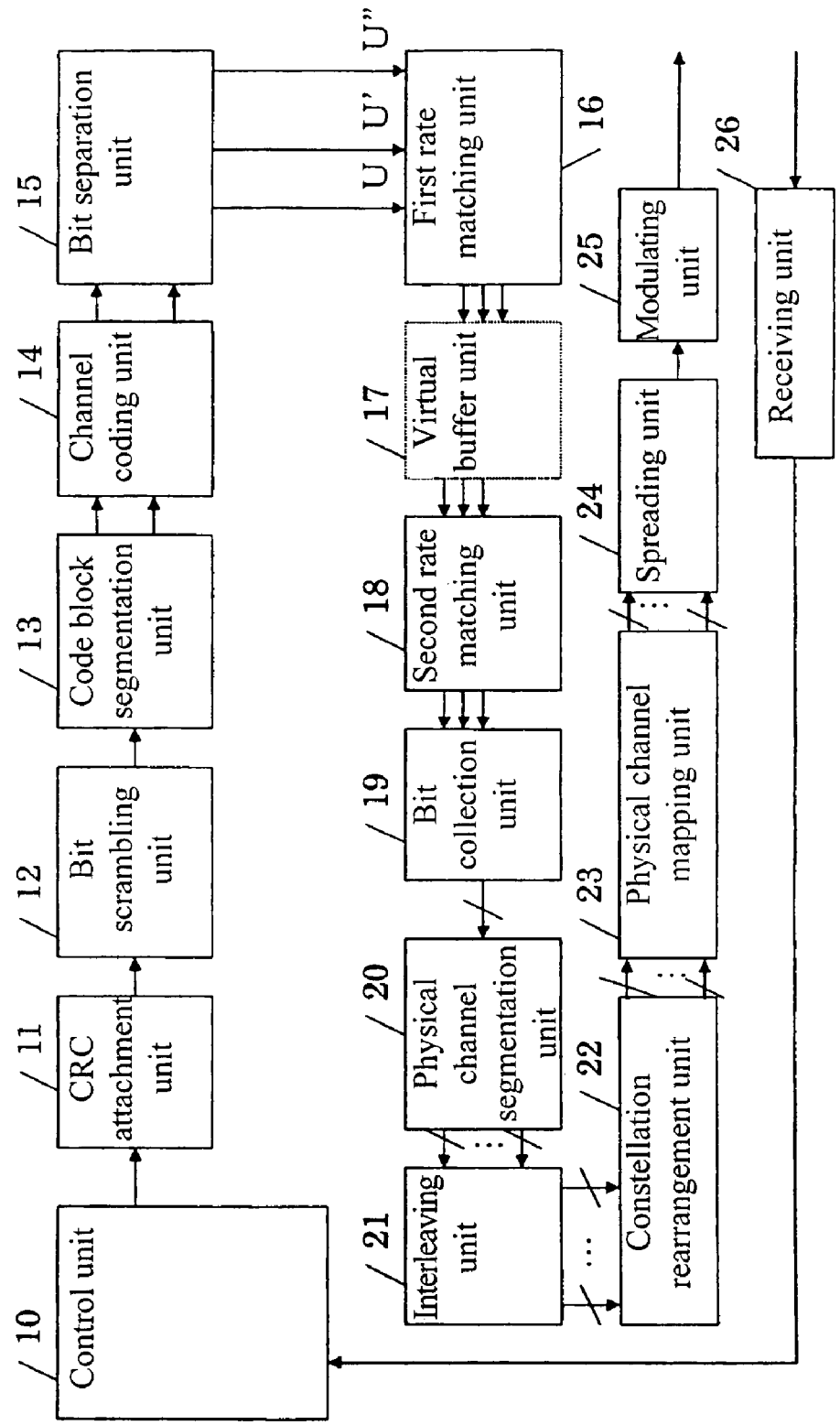
FIG. 3 is a drawing which illustrates a transmission device (wireless base station).

The first de-rate matching unit 335 performs processing corresponding to the opposite of the first rate matching performed in the wireless base station in FIG. 3, and outputs the results thereof to the channel decoding unit 336.

The channel decoding unit 336 performs decoding (e.g., turbo decoding) on newly received data which has undergone de-rate matching, and outputs the decoding results to the CRC check unit 337.

The CRC check unit 337 performs error detection processing on the decoding results, using the CRC bits contained therein.

The CRC check unit 337 then notifies the control unit 339 (control unit 35) of the CRC check results and provides the decoding results directly to the output selection unit 338.

The control unit 338 performs control such that, if the CRC check results indicate that there is no error, the output selection unit 338 is made to output the decoding results, while if there is an error, the output selection unit 338 is kept from outputting the decoding results.

The control unit 35 receives the HS-PDSCH decoding results from the output selection unit 338 and the CRC check results from the CRC check unit 337 (control unit 338), generates a NACK signal if there was a CRC error or an ACK signal if there was no CRC error, and provides it to the transmission processing unit 34.

If there was no CRC error, output based on that data, such as display control to a display unit, is enabled.

Figure 2:
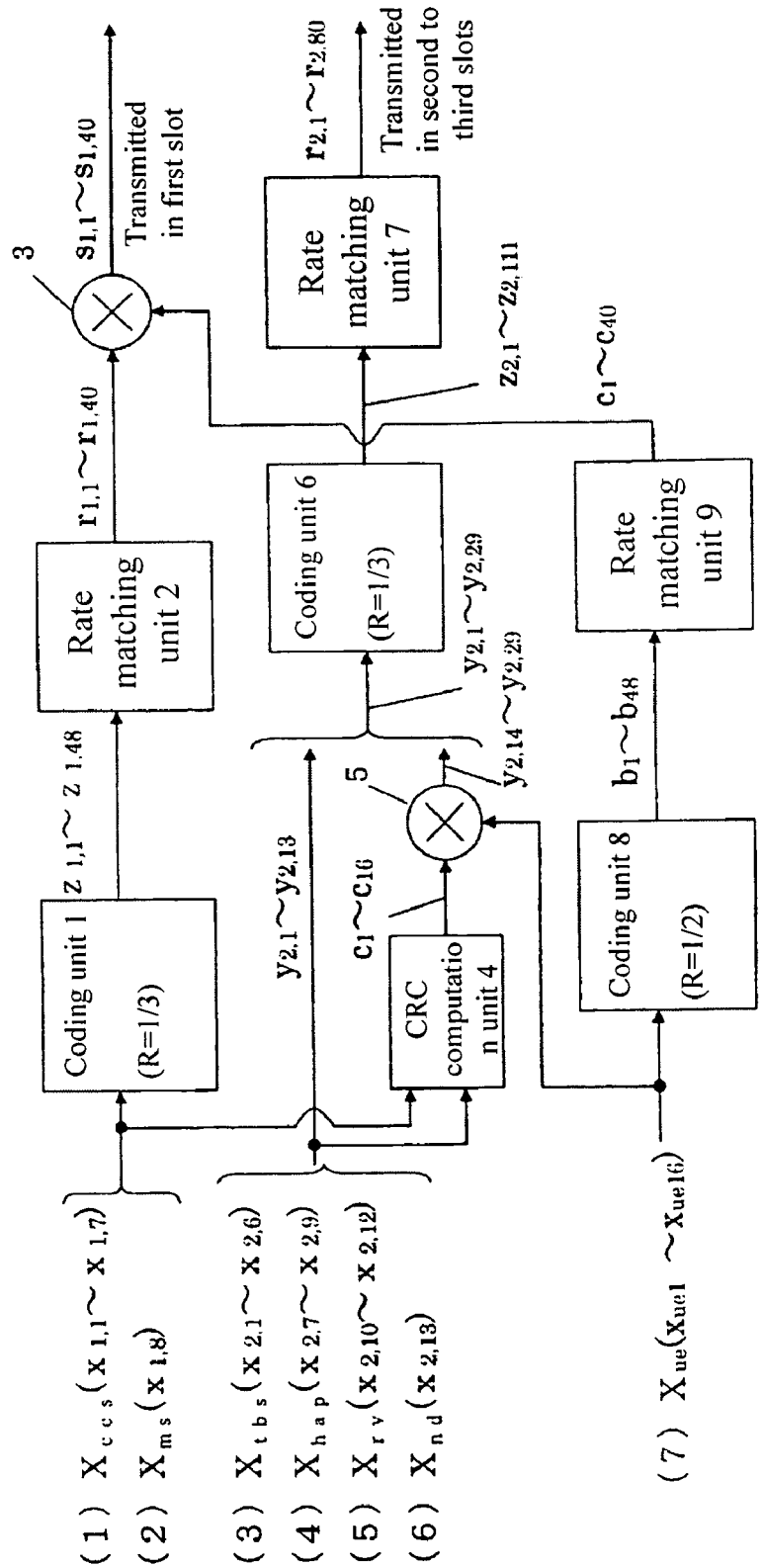
FIG. 2 is a drawing which illustrates an HS-SCCH coding unit.

The transmission processing unit 34 transmits the ACK signal or NACK signal using the appropriate slot indicated in FIG. 1.

Operation During Retransmission of Data

If an ACK signal was transmitted to the transmission processing unit 34, the next new transmission of data is transmitted from the wireless base station of FIG. 3, while if a NACK signal was transmitted, retransmission is executed for the same data. The same data is not necessarily used for retransmission; a different data portion may be transmitted as the retransmission according to the rate matching pattern of the transmitting side.

The demodulation unit 330, as stated above, executes demodulation processing, including de-spreading and the like, according to the information indicated in the first part.

The second de-rate matching unit 331 furthermore executes processing, corresponding to the opposite of the second rate matching (the processing of the second rate matching unit 18) performed in the wireless base station, based on the Xrv indicated in the second part. If the transmission was made with a plurality of spreading codes, multiplexing is performed at the same time.

The output of the second de-rate matching unit 331 is fed to the reception quality evaluation unit 334 and combining unit 332.

The reception quality evaluation unit 334 is notified by the control unit 339 (or control unit 35) that this is a retransmission reception, and thus evaluates the reception for the input retransmitted received data by a technique as described above.

Since the reception quality evaluation unit 334 is informed by the control unit 339 (or control unit 35) that this is a retransmission reception, it reads the newly received data stored in the storage unit 333 and also evaluates the reception quality in the same manner for the combined data which constitutes the results of combining thereof with the retransmitted received data in the combining unit 332.

In the combining, if there is data corresponding to the same bits in the data to be combined, the likelihood (soft decision result) is averaged or the like, and if there is no data corresponding to the same bits in the data to be combined, the missing data is supplemented.

Thus, the reception quality evaluation unit 334 evaluates the reception quality for retransmitted received data (or combined data) and is consequently able to notify the control unit 339 of the results of this evaluation.

Having been notified of the evaluation results, the control unit 339 determines, according to the evaluation results, whether first de-rate matching in the first de-rate matching unit 335 and error correction decoding in the channel decoding unit 336 should be executed on this retransmitted received data (or combined data).

For example, if the reception quality evaluation results for the retransmitted received data (or combined data) are below a specific reference value, control would be performed such that the retransmitted received data (or combined data) is not subjected to first de-rate matching and error correction decoding (preferably, power supply to the first de-rate matching unit 335 and channel decoding unit 336 would be stopped).

If error correction decoding was not performed, the control unit 35 transmits a NACK signal, prompting the wireless base station to perform retransmission.

However, for example if the reception quality evaluation results for the retransmitted received data (or combined data) are above a specific reference value, the combined data is input into the first de-rate matching unit 335.

The first de-rate matching unit 335 performs processing corresponding to the opposite of the first rate-matching performed in the wireless base station in FIG. 3, and outputs the result to the channel decoding unit 336.

The channel decoding unit 336 performs decoding (e.g. turbo decoding) on the combined data which has undergone de-rate matching and outputs the decoding results to the CRC check unit 337.

The CRC check unit performs error detection processing on the decoding results, using the CRC bits contained therein.

It then notifies the control unit 339 (control unit 35) of the CRC check results and provides the decoding results directly to the output selection unit 338.

If the CRC check results indicate that there is no error, the control unit 339 causes the output selection unit 338 to output the decoding results, while if the CRC check results indicate that there is an error, the output selection unit 338 is not made to output the decoding results.

The control unit 35 receives the decoded data and the CRC check results from the selection unit 338 and CRC check unit 337 (control unit 339), generates a NACK signal if there was a CRC error or an ACK signal if there was no CRC error, and provides it to the transmission processing unit 34.

The transmission processing unit 34 transmits these signals using the appropriate slot indicated in FIG. 1.

In the above embodiment, the reception quality of retransmitted received data or the reception quality of combined data was evaluated and control was performed as to whether to decode the retransmitted received data or combined data based on the results of that evaluation. However, it is also possible to control whether or not to decode the retransmitted received data (or combined data) based on the relationship between the reception quality for the retransmitted received data (or the reception quality for the combined data) and the reception quality for newly received data.

For example, in the case where the reception quality for retransmitted received data (or the reception quality for combined data) is inferior to a specific degree as compared to the reception quality for newly received data, control would be performed so as not to decode the retransmitted received data (or combined data); otherwise, control would be performed so as to decode the retransmitted received data (or combined data).

Specifically, these are cases where (reception quality for retransmitted received data)/(reception quality for newly received data) is 1/N or less (N is a number greater than 1) or cases where (reception quality for newly received data)−(reception quality for retransmitted received data) is less than a specific value.

The control unit 35 determines the CPICH reception environment by means of an unillustrated reception processing unit (e.g. by determining the SIR), generates CQI information based on the results of that determination, and provides it to the transmission processing unit 34.

The transmission processing unit 34 periodically transmits CQI information using the slot indicated in FIG. 1. According to this CQI information, adaptive control is performed in the base station to make the transport speed faster if the reception environment is good and to make the transport speed slower if the reception environment is not good, as was described above.

In the present embodiment, as described above, decoding is not performed in cases where it is assumed that error will ultimately not be eliminated even if error correction decoding is performed, thus reducing the power consumption of the wireless communication device.

(b) Description of Second Embodiment

The second embodiment reduces the level of influence, of data was not eliminated by error correction decoding despite the high reception quality (soft decision likelihood, reception SIR, etc.), on the next error correction decoding error, thereby reducing its adverse effect.

First Aspect

Under "Operation during retransmission of data" in the first embodiment, the case was described where control is performed as to whether to decode retransmitted received data or combined data based on the relationship between the reception quality for retransmitted received data or the reception quality for combined data and the reception quality for newly received data, whereas in the first aspect, rather that controlling whether or not to decode, control is provided so as to decode retransmitted received data (and conversely to not decode combined received data).

For example, if the reception quality for retransmitted received data or the reception quality for combined data is inferior to the reception quality for newly received data by a specific degree (for the specifics of this, see the first embodiment), control is performed so as not to decode the combined data and so as to decode the retransmitted received data.

Thus, newly received data for which error correction decoding gave an error despite the relatively high reception quality is not used, and error correction decoding is executed using retransmitted data, making it possible to reduce the influence of newly received data which leads the error correction decoding to an error and increasing the probability of obtaining error-free error correction decoding results.

Besides the relationship of the reception quality for retransmitted received data or the reception quality for combined data to the reception quality for newly received data, the fact that the reception quality for newly received data exceeds a high reception quality criterion can also be used as a condition based on which such control is performed.

This would make it possible to effectively reduce the level of influence of received data containing problems such as errors not being eliminated by error correction decoding despite an adequately high reception quality.

Furthermore, in this embodiment, it was decided to decode retransmitted received data, and in this case, the control unit 339 can cause not the combined data but the retransmitted received data to be stored in storage unit 333.

If the control unit 339 (control unit 35) detects that there are errors in the decoding results for the retransmitted received data, retransmission would be repeated, and in this case, the control unit 339 would control the combining unit 332 and channel decoding unit 336 so as to perform error correction decoding after combining the retransmitted received data with the previously stored retransmitted received data.

Combining gain can thereby be attained while reducing the influence of problematic newly transmitted data.

Second Aspect

Under the second aspect, rather than not using the newly received data at all, it is made use of after reducing its level of influence.

For example, if the reception quality for retransmitted received data is inferior to a specific degree as compared to the reception quality for newly received data (for the specifics of this, see the first embodiment), when the combining unit 332 combines the newly received data read from the storage unit 333 with the retransmitted received data, the control unit 339 provides control such that decoding will be performed after multiplying the newly received data by 1/n (n is a number greater than 1) and combining it with the retransmitted received data.

This combining method reduces the level of influence of problematic newly received data.

The value of n here can be a value corresponding to (reception quality of retransmitted received data)/(reception quality of newly received data).

This allows for control of the level of influence according to the proportion of the reception quality n.

Besides the relationship of the reception quality for retransmitted received data to the reception quality for newly received data, the fact that the reception quality for newly received data exceeds a high reception quality criterion can also be used as a condition based on which such control is performed.

Third Aspect

Under the third aspect, the combining method used during combining is devised so as to reduce the level of influence of newly received data.

For example, if the reception quality for retransmitted received data is inferior to a specific degree as compared to the reception quality for newly received data (for the specifics of this, see the first embodiment), when the combining unit 332 combines the newly received data read from the storage unit 333 with the retransmitted received data, either one or both of the following algorithms are applied.

First Algorithm

If there is a data portion corresponding to the same bits between the newly received data and the retransmitted received data, then for that portion, the data contained in the retransmitted received data is used, and not the data contained in the newly received data (soft decision data).

In other words, when receiving a retransmission, for data portions contained in the newly received data read from the storage unit 333 which are contained in the retransmitted received data, the combining unit 332 performs combining by substituting the retransmitted received data for the newly received data.

As a result, the first de-rate matching unit 335, channel decoding unit 336, etc. perform decoding based on data which has undergone combining using this substitution.

Data which has undergone combining using this substitution is then stored in the storage unit 333 for combining with the next retransmitted received data.

This makes it possible to eliminate the influence of newly received data for data portions contained in the retransmitted received data.

Second Algorithm

If there are bit portions which are contained in the newly received data but are not contained in the retransmitted received data, then for those portions, the data contained is in the newly received data (soft decision data) is multiplied by 1/N, as described previously, and is then combined with the retransmitted received data.

In other words, when receiving a retransmission, for portions of data contained in newly received data read from the storage unit 333 (soft decision data) which are not contained in the retransmitted received data, the combining unit 332 performs processing whereby the newly received data is multiplied by 1/N and then combined (supplemented) with the retransmitted received data.

As a result, the first de-rate matching unit 335, channel decoding unit 336, etc. perform decoding based on data which has undergone this combining (supplementation).

Data which has undergone this combining using (supplementation) is then stored in the storage unit 333 for combining with the next retransmitted received data.

This makes it possible to reduce the level of influence of newly received data while using it for data portions not contained in the retransmitted received data.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A wireless communication device for performing error correction decoding after combining newly received data for new transmission and retransmitted received data for retransmission, the wireless communication device comprising:

a storage unit to store the newly received data;

a reception quality evaluation unit to evaluate reception quality for the retransmitted received data or reception quality for combined data obtained by combining the retransmitted received data with the newly received data stored in the storage unit; and a control unit to perform control as to whether to decode or not to decode the retransmitted received data or the combined data according to the results of the evaluation; wherein:

the control unit is further to perform control such that decoding is not performed for the retransmitted received data or the combined data if the reception quality for the retransmitted received data or the reception quality for the combined data is below a specific reference value.

2. A wireless communication device as set forth in claim 1, wherein the evaluation of reception quality is performed based on a likelihood that the received signal represents each signal point.

3. A wireless communication device for performing error correction decoding after combining newly received data for new transmission and retransmitted received data for retransmission, the wireless communication device comprising:

a storage unit to store the newly received data;

a reception quality evaluation unit to evaluate a first reception quality for the newly received data and a second reception quality for the retransmitted received data; and a control unit to perform control such that decoding is performed after multiplying the newly received data stored in the storage unit by 1/n (wherein n is a number greater than 1) and combining it with the retransmitted received data if the second reception quality is inferior to a specific degree as compared to the first reception quality.

4. A wireless communication device as set forth in claim 3, characterized in that n corresponds to the second reception quality divided by the first reception quality.

5. A wireless communication device for performing error correction decoding after combining newly received data for new transmission and retransmitted received data for retransmission, the wireless communication device comprising:
- a storage unit to store the newly received data;
- a reception quality evaluation unit to evaluate a first reception quality for the newly received data and a second reception quality for the retransmitted received data; and
- a control unit to perform control such that, when the second reception quality is inferior to a specific degree as compared to the first reception quality, during the combining, data portions contained in the newly received data but not contained in the retransmitted received data are multiplied by 1/n (wherein n is a number greater than 1) and then combined.

6. A wireless communication device for performing error correction decoding after combining newly received data for new transmission and retransmitted received data for retransmission, the wireless communication device comprising:
- a storage unit to store the newly received data;
- a reception quality evaluation unit to evaluate a first reception quality for the newly received data and a second reception quality for the retransmitted received data; and
- a control unit to perform control such that, if the second reception quality is inferior to a specific degree as compared to the first reception quality, the retransmitted received data is stored in the storage unit, and decoding is performed after combining the retransmitted received data stored in the storage unit with data received in an additional retransmission.

\* \* \* \* \*